Nov. 28, 1939.　　　E. O. WHEATON　　　2,181,647
TRANSMISSION CONTROL
Filed April 16, 1934　　　8 Sheets-Sheet 1
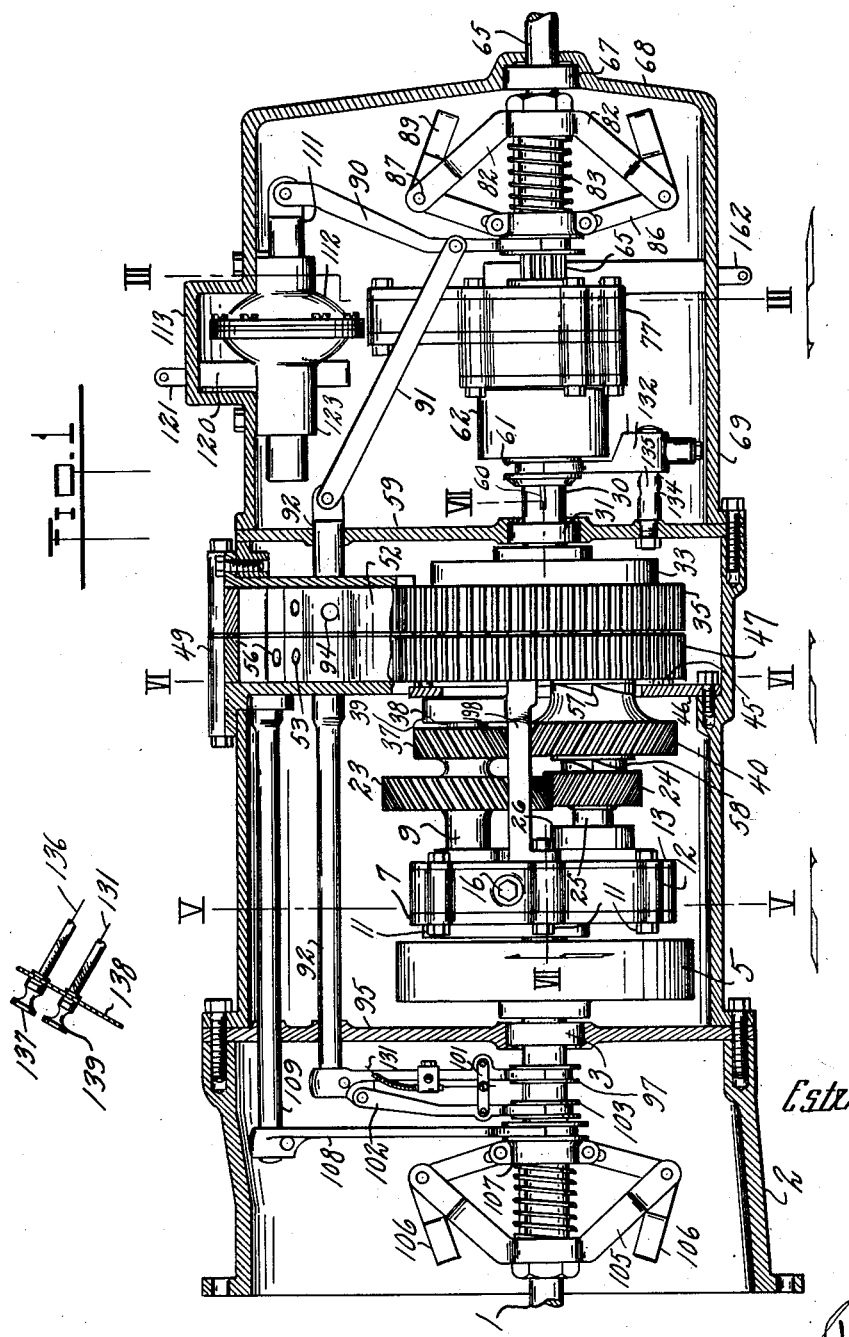
Ester O. Wheaton
Inventor

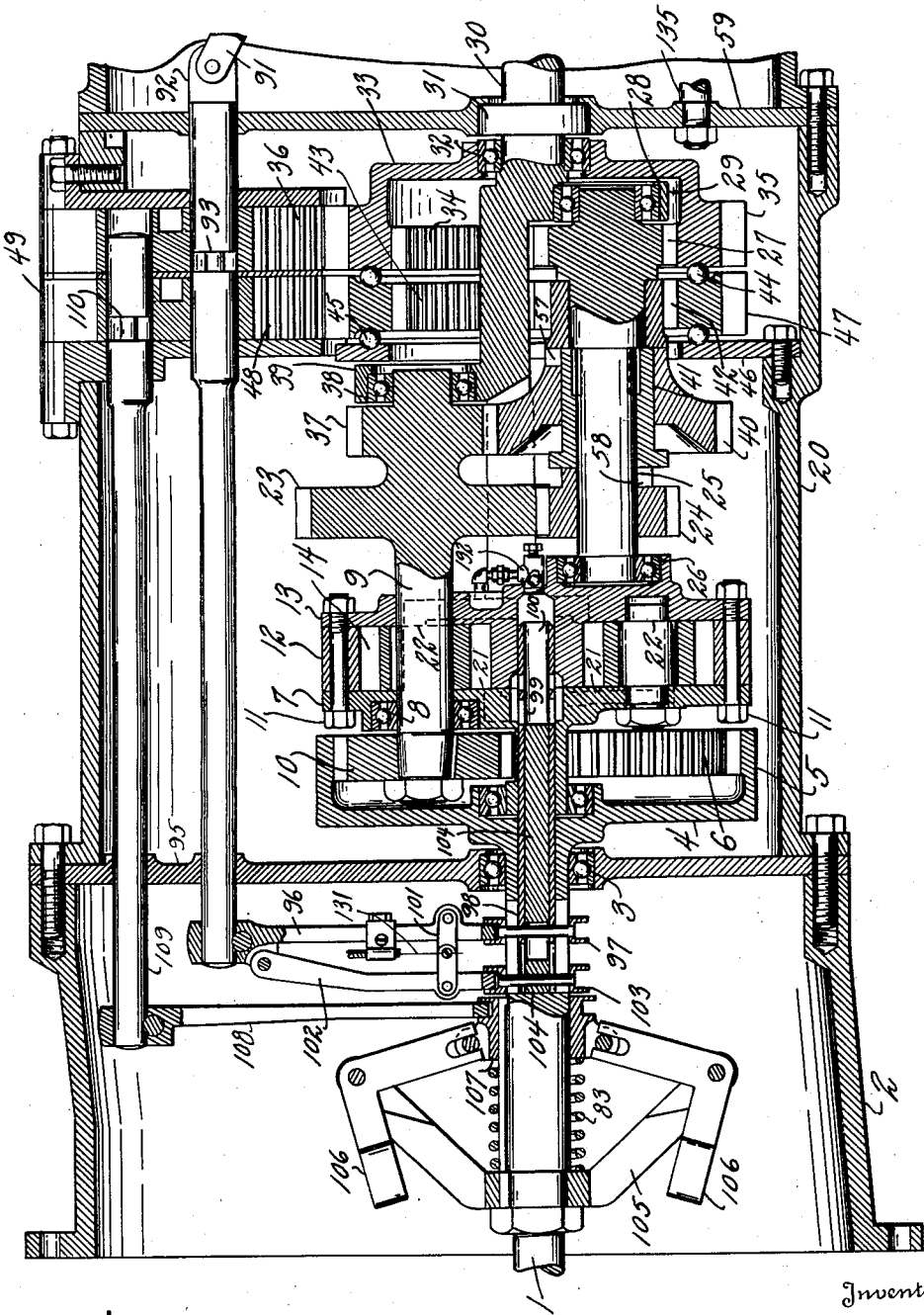

Nov. 28, 1939.   E. O. WHEATON   2,181,647
TRANSMISSION CONTROL
Filed April 16, 1934   8 Sheets-Sheet 3
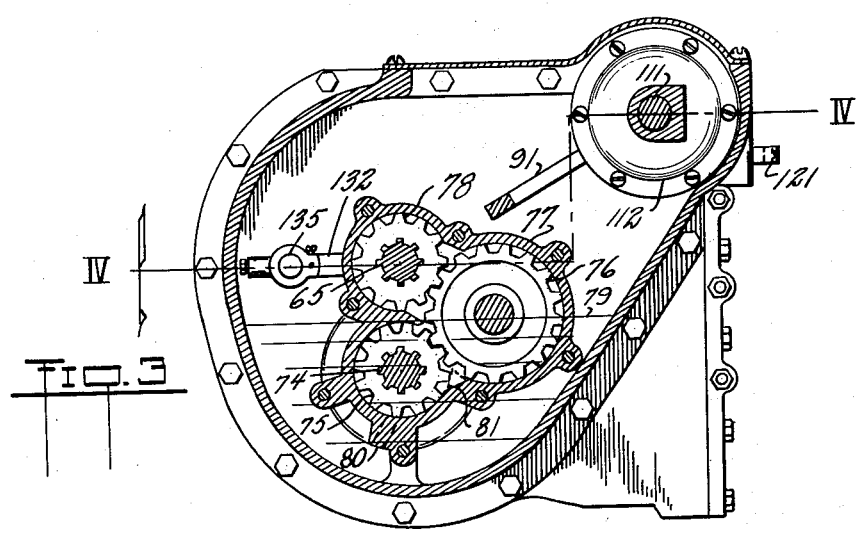
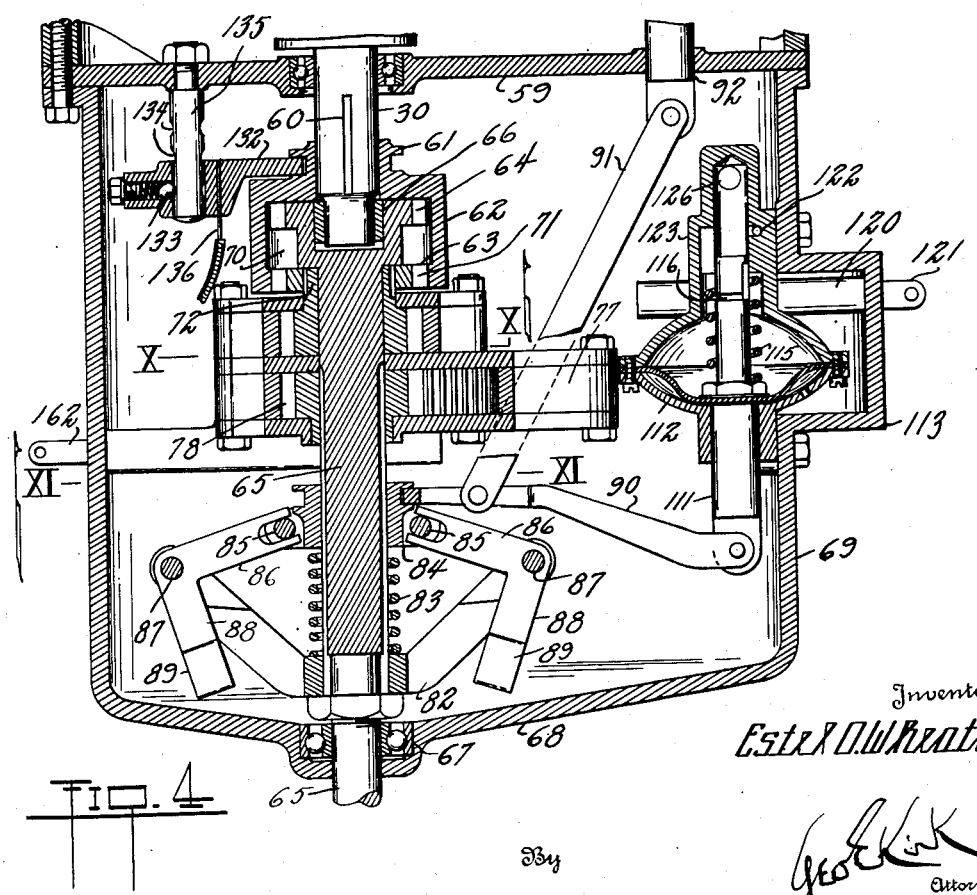
Inventor
Ester O. Wheaton
By
Geo. E. Kirk
Attorney

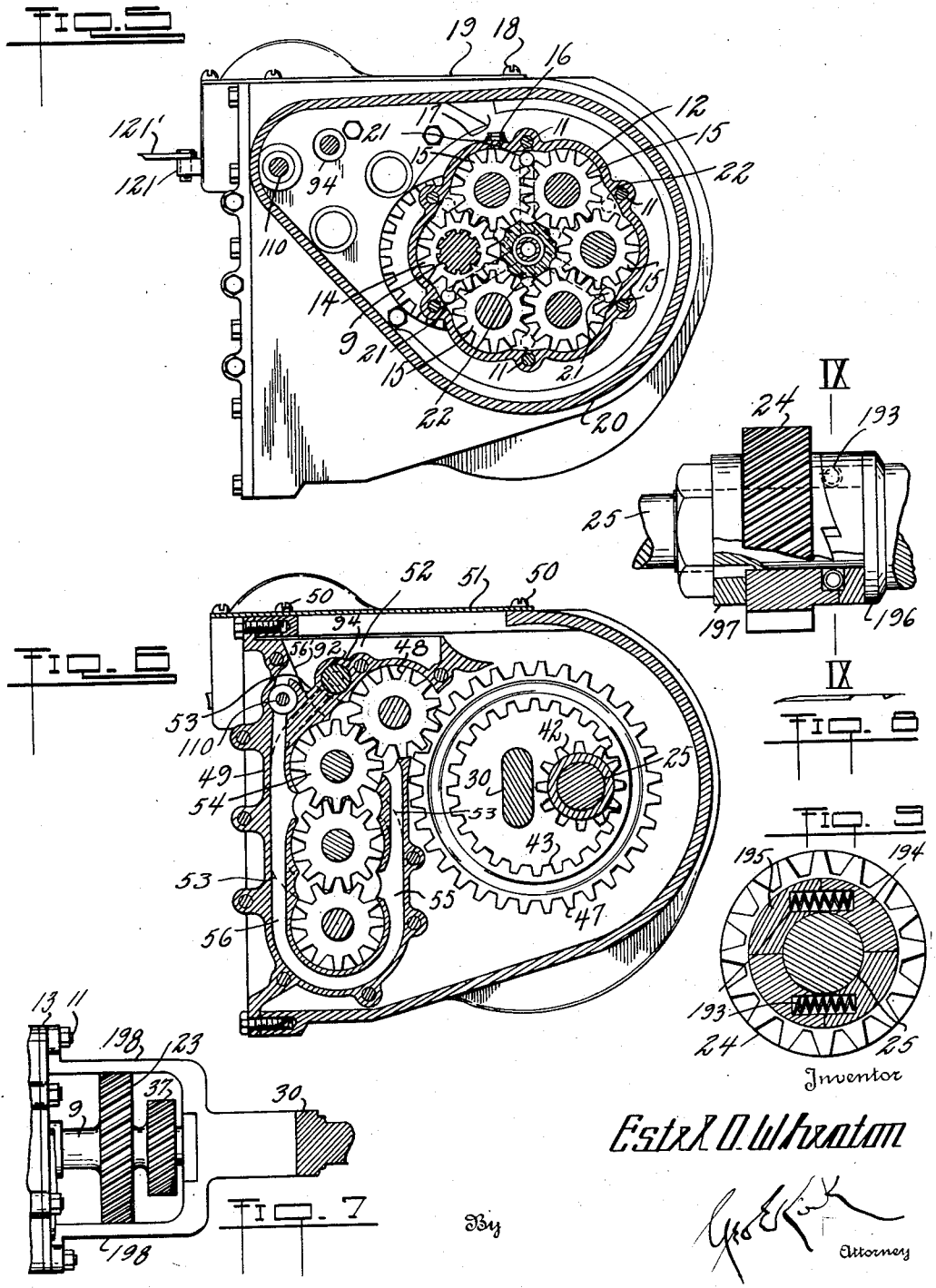

Nov. 28, 1939.  E. O. WHEATON  2,181,647
TRANSMISSION CONTROL
Filed April 16, 1934   8 Sheets-Sheet 5

Inventor
Estel O. Wheaton
By
Attorney

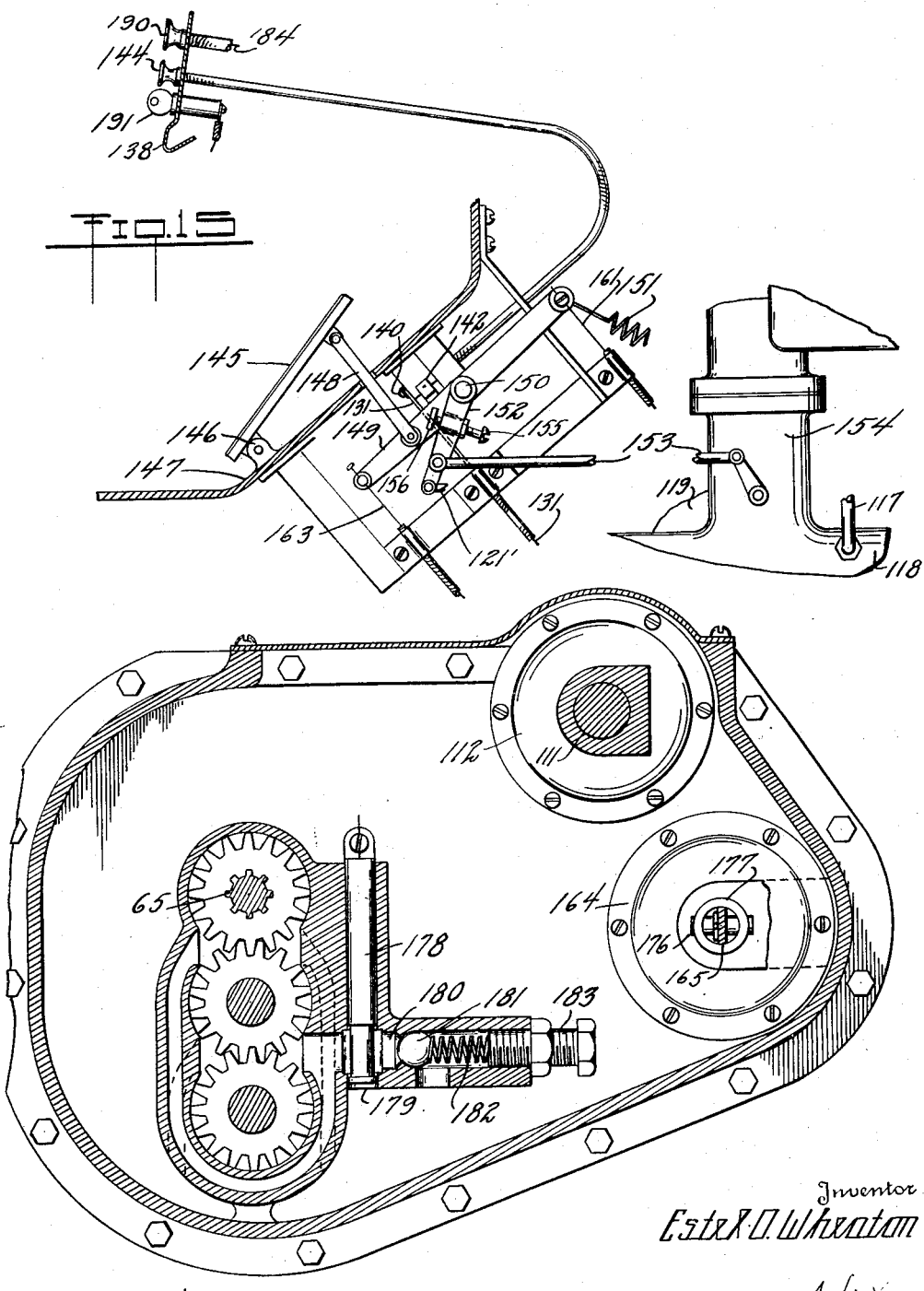

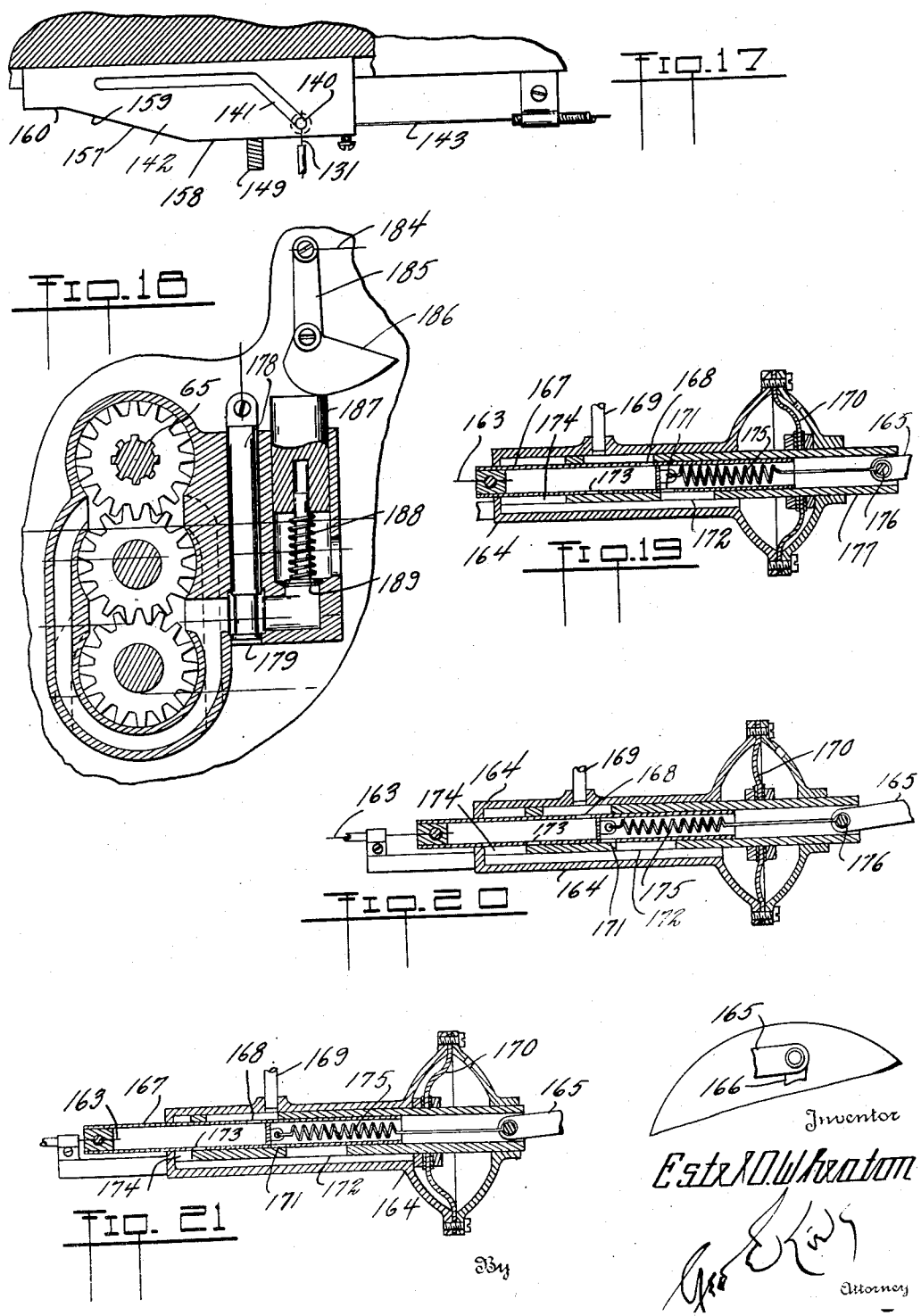

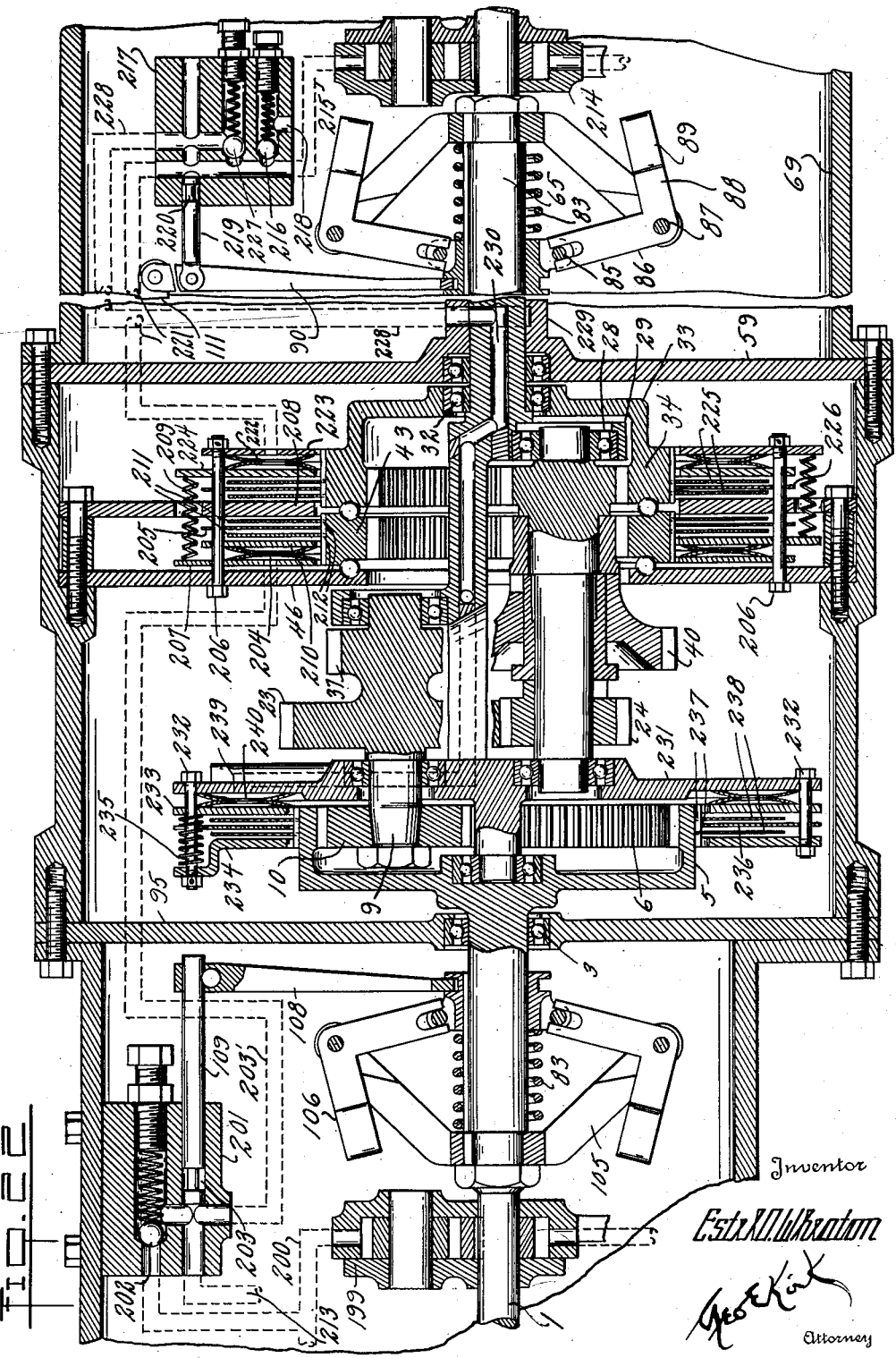

Patented Nov. 28, 1939

2,181,647

UNITED STATES PATENT OFFICE 2,181,647

TRANSMISSION CONTROL

Estel O. Wheaton, Toledo, Ohio, assignor to Kelly-Wheaton Company, Toledo, Ohio, a corporation of Ohio Application April 16, 1934, Serial No. 720,822

1 Claim. (Cl. 74—293)

This invention relates to controlling driving rotation.

This invention has utility when incorporated in multispeed transmission with hydraulic cooperative control including connecting, disconnecting and speed change features, more especially as affected by the internal combustion motor in a motor vehicle and the rate of travel therefrom.

Referring to the drawings:

Fig. 1 is a section through the housing disclosing an embodiment of the transmission hereunder;

Fig. 2 is a section on an enlarged scale of portions of the transmission at the left in Fig. 1;

Fig. 3 is a section on the line III—III, Fig. 1, showing features of the hydraulic braking;

Fig. 4 is an enlarged view, with parts in section, of portions of the device on the line IV—IV, Fig. 3;

Fig. 5 is a section on the line V—V, Fig. 1, showing a feature of the hydraulic connection at the planetary gearing;

Fig. 6 is a section on the line VI—VI, Fig. 1, showing features of hydraulic control at intermediate speed;

Fig. 7 is a view on the line VII—VII, Fig. 1;

Fig. 8 is a view of a modified type of overwinding clutch connection;

Fig. 9 is a view on the line IX—IX, Fig. 8;

Fig. 15 is a fragmentary view of the operator station as to controller manipulations for installation with the transmission hereunder;

Fig. 16 is a hydraulic brake adaptable to the assembly in lieu of the showing in Fig. 3;

Fig. 17 is a detail view of features of the control cam for the accelerator pedal mechanism of Fig. 15;

Fig. 18 is a detail view of a more readily adjustable relief for control of the brake of the general type of Fig. 16;

Fig. 19 is a detail view of the pneumatic device adapted to be controlled by the accelerator pedal in Fig. 15, at the idle position therefor;

Fig. 20 is a view of the device of Fig. 19 for brake control at an intermediate position;

Fig. 21 is a view similar to Fig. 19 of the pneumatic brake control at fully thrown or active position; and Fig. 22 is a view of hydraulic adaptations for control in applying frictional resistance in lieu of fluid pump.

Figure 10:
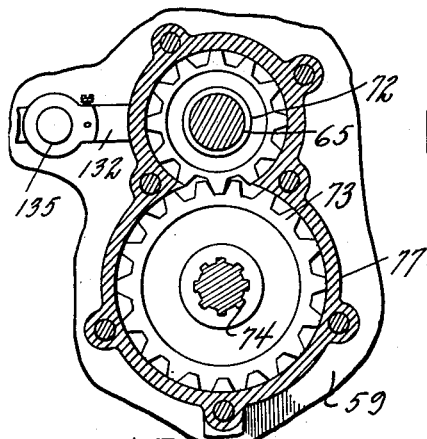
Fig. 10 is a section on the line X—X, Fig. 4, showing the reverse direction drive gearing.

From a prime mover as an internal combustion motor, there may be actuation of shaft 1 in housing section 2 (Figs. 1, 2). This shaft 1 is mounted in bearings 3 and extends therepast to carry flange 4 having overhang 5 for annular gear 6. Concentrically with this shaft 1, there is flange 7 having bearings 8 for stub shaft 9. This stub shaft 9 protrudes, through the bearings 8, and carries pinion 10 fixed therewith and in mesh with annular gear 6 at the overhang 5. Bolts 11 through the flange 7 assemble housing section 12 and inwardly extending flange 13 with the flange 7. There is thus provided in this planetary gearing system of this planet pinion 10 and the annular gears 6, pump pinion 14 keyed on the stub shaft 9.

This pump pinion 14 is in annular series with pinions 15 in this housing 7, 12, 13. Filling plug 16 (Fig. 5) may be removed through opening 17 as screws 18 permit removal of plate 19 on casing section 20. The hydraulic medium, as oil, may thus be introduced and churned into the casing 7, 12, 13, for filling such structure with the pumping action taking place from intake ducts 21 past the meshing gears in pairs to exhaust ducts 22.

Fixed on the stub shaft 9 and outside the planetary housing and hydraulic device for control of the same is gear 23. This stub shaft 9 is eccentric of the shaft 1 in its extent from the planetary gearing housing. This gear 23 thereby receives rotation from the shaft 1 through the annular gear 6, pinion 10, stub shaft 9, gear 23 to pinion 24, connectable to shaft 25. This shaft 25 has bearing 26 in the flange 13 of the pump housing or hydraulic control of the planetary gearing system. This shaft 25 has fixed therewith pinion 27 adjacent bearing 28 for this shaft 25. This bearing 28 is in arm 29 as a crank or eccentric from shaft 30 in alignment with the shaft 1 and mounted in bearings 31.

On this shaft 30, adjacent the bearings 31, are bearings 32 for flange 33 carrying annular gear 34 in mesh with the pinion 27. This annular gear 34 has external tooth region 35 which may be held or controlled by pinion 36. This is for the intermediate speed transmission.

For first or low speed transmission, there is fixed on the stub shaft 9 adjacent the gear 23, pinion 27 adjacent the bearing 28 for this shaft 9. The gear 37, as well as the different diameter gear 23, are eccentric to the axis of the planetary gearing. This bearing 38 is in arm or crank 39 of the shaft 30 and is shown at 180° from the crank or arm 29. The pinion 37 is in mesh with gear 40, freely rotatable on sleeve 41 on the shaft 25. Connectable with this gear 40 is pinion 42 adjacent the pinion 27 and rotatable relatively thereto. This pinion 42 is in mesh with annular gear 43 spaced by bearings 44 from the gear 34 and by bearings 45 from holding plate 46 in the casing 20. This annular gear 43 has external toothed portion 47 and is in this respect similar to the annular gear 34 having the external tooth portion 35. The holding or control of this annular gear 43 is effected by pinion 48 adjacent the pinion 36. This gear 48 (Fig. 6) is in minor casing 49 having screws 50 removable to take off plate 51 so that hydraulic medium may be poured into receptacle 52 in the upper portion of this casing 49, to flow by port 53 into a region about the pumping gear 48 and its companion pumping gear 54, with flow from port 53 by duct 55 and thence by riser 56. It is thus seen that with the gear 47 held for the first or low speed transmission, the rotation of the pinion 42 is effective through the shaft 25 to cause the crank 29 to rotate the driven shaft 30. When the connection for the hydraulic control gear 36 holds the gear 34, a higher speed of rotation is effective for this shaft 25 which disconnects the gear 40 from the pinion 42, due to the action of overrunning clutch 57.

This withdrawal action is effective in the overrunning against the normal transmission action of the helical teeth of the gearing. The operation may be such that there is overrunning, say from the shaft 30 or the crank 29, even as to the pinion 24, thereby effecting release of overrunning clutch connection 58 with the sleeve 41 which connects this pinion 24 with the pinion 27.

In the housing there is partition wall 59 carrying the bearing 31 (Figs. 2, 4). Spline connection 60 on the shaft 30 holds collar 61 and overhang 62 for rotation with this driven shaft 30. This overhang 62 has an annular tooth portion 63 effective as the collar 61 is moved toward the bearing 31 to bring this annular tooth portion 63 as a jaw device into mesh relation with tooth portion 64, fast with shaft 65, in alignment with the shaft 30 and having a cooperating bearing 66 therebetween. This shaft 65 has bearing 67, and protrudes through housing wall 68 of casing 69. This is in the direct or forward drive transmission or connection for the device. If the collar 61 be shifted to an intermediate position at clearance region 70 as to the tooth member 64, there is a neutral or non-driving relation. At the remote position from the bearing 31 the portion 63 is in mesh with tooth portion 71 fixed with sleeve 72 which has laterally thereof a toothed portion in mesh with gear 73 (Fig. 10), fixed with gear 74. Also fast on this shaft 74 is gear 75 (Fig. 3). This pinion 75 is in mesh with gear 76 in housing 77. The gear 76 is in mesh with pinion 78 fixed with the shaft 65. This housing 77 in casing 69 is normally sufficiently submerged to have a liquid 79 therein for hydraulic control of this hydraulic device with intake port 80 and exhaust port 81.

Adjacent the wall 68 is spider 82 (Fig. 4) fixed on the shaft 65. Compression helical spring 83 normally thrusts collar 84 away from this spider 82. This collar 84 has pins 85 coacting with arms 86 having pivotal mountings 87 on the spider 82. These arms 86 are inwardly extending and form portions of levers which have beyond the fulcra 87 arms 88 to fly weights 89. There is accordingly herein provided a centrifugal speed device effective through the collar 84 to operate arm 90. This arm 90 is connected by link 91 to plunger 92 (Fig. 2), extending through the partition 59 and having balanced valve port 93 effective as a valve device for controlling flow into the receptacle 52 (Fig. 6) by exhaust port 94 past this valve 93 to effect by hydraulic control the pumping action of the gear 36. At the open position the gear 36 is freely rotatable and there is no holding action for the annular gear 34. This plunger 92 extends past this housing for the selective gear through the partition or diaphragm 95 which carries the bearing 3. This plunger 92 in the housing 2 has depending arm 96 coacting with collar 97 on the shaft 1. This collar 97 is connected to sleeve 98 extending into the housing 13 and is there provided with port 99 controlling the intake 21 to this planetary hydraulic control. The circulaton to this intake port 21 is from the duct 22 through tubular terminus 100 of this sleeve 98 to the port 99. That position of this plunger 92 which effects shifting of this sleeve 98 into cut-off position for the exhaust duct 22, locks this hydraulic control of the planetary gearing so that the pinion 10 does not rotate relatively to the annular gear 6, and there is a revolution of the shaft 9 instead of rotation. This revolution of the shaft with the crank 39 carries the crank 29 therewith and effects the direct rotation of the shaft 30 at the speed of the shaft 1.

The arm 96 is connected through toggle 101 with arm 102, located adjacent the arm 96 and extending to collar 103 on the shaft 1 adjacent the collar 97. This collar 103 is connected to plunger 104 in the sleeve 98 and is operable to close the port 99 independently of the position of the sleeve 98. Accordingly, in this position there is a locking of the planetary gearing. This is a position which cuts off reverse flow and precludes free wheeling. It thus follows that when the port 99 is left open by the plunger 104, free wheeling may occur. In the previous locking for the direct drive, the shaft 1 was taken as having a controlling speed beyond that of the car. In the event the car, while connected for high speed or direct driving, has a speed beyond that of the motor, such may not be effective to reverse any flow condition in the planetary gearing hydraulic control when this device 104 closes the ports 99, for then the overrunning is taken into account at the clutches 58 and 57. It is thus seen that, as to the first and second speeds, there is free wheeling due to the overrunning action permitted in these clutches and that selectively such may be effective in high speed by breaking the toggle 101.

Figure 13:
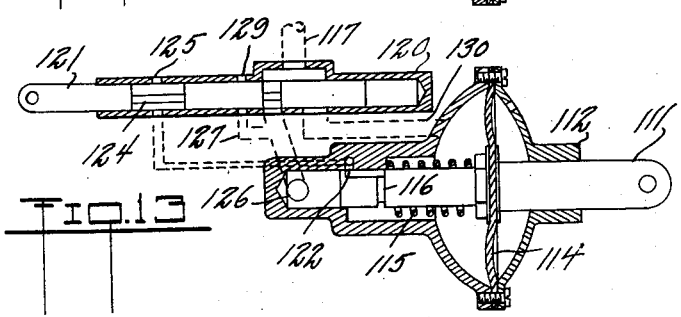
Fig. 13 is a view of the device of Fig. 12 at an intermediate control position.
Figure 14:
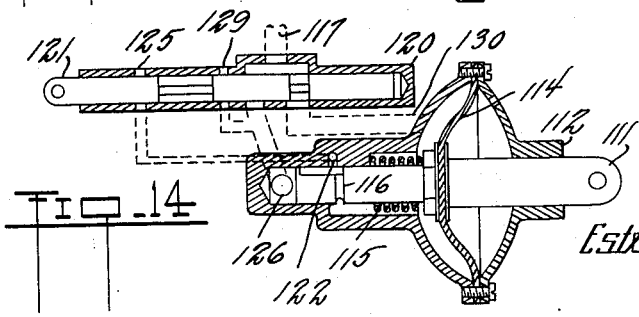
Fig. 14 is a view of the device of Fig. 12 at the fully thrown position for control.

Fixed with the shaft 1 is spider 105 as a mounting for fly weight 106 connected to collar 107. This collar 107 is connected by arm 108 to plunger 109, parallel to the plunger 92. This plunger 109 has balanced port valve device 110 effective adjacent the valve device 93 in controlling the exhaust port 56' and thus acting upon the gear 48 in the holding of the gear 47 for first speed driving. The arm 90 is connected to plunger 111 (Fig. 4) extending to housing 112 adjacent casing enlargement 113. In this housing 112 (Figs. 12, 13, 14) is diaphragm 114 fixed with the plunger 111.

Compression helical spring 115 normally tends to thrust this diaphragm of the diaphragm device toward the arm 90.

Figure 12:
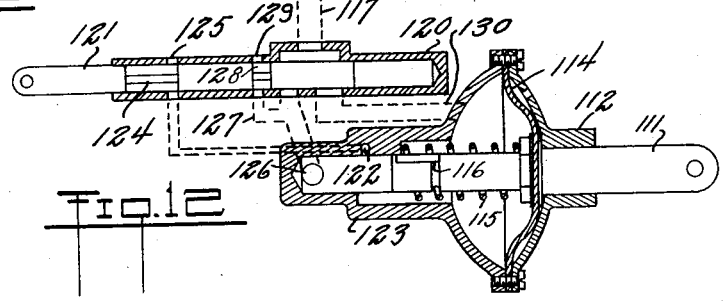
Fig. 12 is a detail view in section for control of a pneumatic device shown at the inactive position.

This spring 115 is about a stem extension from the plunger 111 having port 116. Suction duct 117 (Fig. 12) is connected to intake manifold 118 of internal combustion motor 119 (Fig. 15) and extends to valve 120 (Fig. 12). Manually controllable plunger 121 is shiftable in this chamber 120. At inoperative position for the diaphragm 114, minute seepage port 122 from housing 123 is in communication by valve 124 of the plunger 121 with outlet port 125. Port 126 from the chamber 123 has seepage branch 127 controlled by valve 128 to seepage port 129. Shifting of the plunger 121 to intermediate position (Fig. 13) may be effected by connection 121' (Fig. 15). The port 116 in the extension of the plunger 111 is still open to the passage in the housing 123 so that seepage may occur by the port 122. This may be a poise condition with the port 128 effective from the duct 117 for there is closed off the seepage 129. The end of the extension of the plunger 111 acts as its own cut-off valve which it moves past the end of the passage in the housing 123. The port 116 in the extension of the plunger 111 is still open to the passage in the housing 123 so that seepage may occur by the port 122. Further shifting of this plunger 121 by the manual control connects the suction duct 117 to the valve 128 with duct 130 to the diaphragm chamber, thus effecting full throw for the plunger 111 against the action of the spring 115. There is no seepage now because the valve 124 has closed the seepage port 125.

Here is a supplemental influence manually brought into play in addition to the speed influences for controlling this transmission. With the internal combustion engine effective for creating a vacuum, the arm 90 may transmit the influence thereof through the link 91 to the plunger 92. However, this influence is only as modified by the fly weight device 89 actuated by the driven shaft 65, which may extend to the propeller shaft of the automobile.

This is an influence upon the speed relations between intermediate and high as effective through the gear 34 and for the hydraulic device at the gear 36, and through the arm 96 as effective at the planetary hydraulic device through the gear 14. It is to be noted that the transmission is not effective until the motor speeds up and the fly weight device 106 is effective through the hydraulic control at the pump gear 48 in effecting holding for the gear 43.

This unit accordingly involves in the series, an automobile clutch for connecting into first speed or starting of the motor with automatic shifting therefrom as the drive shaft picks up speed. This may be influenced by the labor of the motor for modifying the travel rate of the vehicle at which the change speeds become effective through the pneumatic device. There is thus a provision in the hydro-pneumatic control that there may be automatic speed connection as the motor is in certain driving relations and the vehicle is in certain speed relations. This means that the connections can be manually readily determined or influenced through the pneumatic device. The propulsion may be effective upon cutting in the ignition for the motor by stepping on the starter. Forthwith there results shifting from the first speed into second and into high, with free wheeling effective for each speed up to high. Furthermore, there may be a selective control for cutting in speed at high through flexible wire 131 (Fig. 2) to break the toggle 101. This flexible wire may be influenced by dash control (Fig. 1). The direction of travel is effected through the shifting of the collar 61 by fork 132 (Fig. 4), having resistance ball 133 coacting with seats 134 on stem 135 projecting from the partition 59.

This shifting of the arm 132 is effected by flexible wire 136 for reverse forward and neutral positions of the seats 134. This shifting is manually effected and this wire 136 extends to a position for the operator to control at pull 137 on dash 138 (Fig. 1). Adjacent this direction control handle 137 (Fig. 1) may be located free wheeling control handle 139.

In carrying out this invention, instead of having the wire 131 for the free wheeling directly connected to the pull handle on the dash, such wire 131 may extend to pin 140 (Fig. 17) in way 141 of cam plate 142 connected to be shifted by flexible transmission connection 143 extending to pull button 144 on the dash 138 (Fig. 15). The operator station herein is shown as equipped with accelerator pedal 145 having fulcrum mounting 146 at foot board 147. This accelerator pedal 145 has link 148 therefrom to lever 149 having fixed fulcrum 150. Spring 151 acts normally to hold the foot pedal or accelerator pedal lifted. Fixed with this lever 149 is arm 152 having link 153 extending to carburetor 154. This position of the arm for the carburetor control may be adjusted by stem 155 as to abutment 156 carried by the lever 149. The position of this lever 149 relative to the foot board 147 is adjusted by this flexible transmission connection 143 by acting on the plate 142, for this plate 142 (Fig. 17) has cam side 157 acting upon this lever 149 determining the position given this pedal 145 by the spring 151. The cam way 141 determines that free wheeling may be cut out, but when free wheeling is cut out the cam 157 is effective for locating a no-brake position 158, a position 159 for fluid brake full setting, and a position 160 for friction brake setting in addition to the fluid brake setting.

Figure 11:
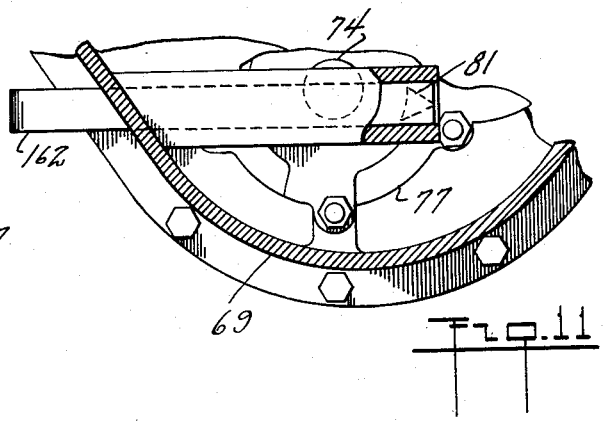
Fig. 11 is a partial section on the line XI—XI, Fig. 4, showing a feature of the control for the brake, Fig. 4.

The fluid brake setting through the accelerator pedal is effected by flexible transmission connection 161 connected to operate member 162 (Fig. 11). It is thus seen there is a lever device for brake control by foot pedal instead of a separate emergency brake lever or even a separate foot brake pedal.

Coincidentally with this control action of the lever 149 as to the flexible transmission connection 161, there is operator 163 (Fig. 15) extending to housing 164 (Fig. 19), from which extends link 165 to operate friction brake arm 166 (Fig. 2) adjacent the rear axle of the vehicle. This housing 164 has therein sleeve 167 with port 168 exposed to fluid power line 169. At idle position for the accelerator pedal, diaphragm 170 is toward the link 165. In pulling the sleeve 167, port 171 is pulled out of register with port 172 thus cutting off escape to the air, and port 173 approaches register with port or clearance 174, with the diaphragm 170 at intermediate position. Further action of the flexible transmission connection 163 brings the port 173 again to register with the port 174 and the shifting of the diaphragm 170 closes off port 173 and holds the brake in this fully thrown or active position. This sleeve 167 in the housing 164 has recover and slack take up for the flexible transmission connection 163 in helical spring 175 extending to pin 176, connecting the link 165 with sleeve 177.

A hydraulic braking system of triangular arrangement (Fig. 3) has been described. The set up may be lineal arrangement (Fig. 16), with plunger 178 coacting with a manual control at outlet 179 with bypass 180 normally past this plunger 178 and ball check 181 having helical spring 182 adjusted by screw 183 for relief. There is thus a determination of the brake action as effective on the driven shaft with the relief against excessive pressure in such braking device. Instead of this relief being pre-set (Fig. 16), there may be manual adjustment of the braking action relief by supplemental manual control 184.

This flexible transmission connection 184 (Fig. 18) may extend to the dash 138 to be operated by handle 190 (Fig. 15) to arm 185 (Fig. 18) effective through cam 186 acting on plunger 187, to vary the compression action of spring 188 on poppet valve 189. In the matter of getting the car under way the first thing is to turn on ignition switch 191. There is thus in this instance a manual control for the holding or braking operation as hydraulically effected on the driven shaft.

In operation the one in the car may turn on the ignition switch 191 (Fig. 15), say as interconnected to the starter, and the motor will begin to function. The connections and controls may be so set that the driving shaft 1 is running idly until there is a speed of say 500 R. P. M. In the power controls herein shown, instead of being interconnected with the electrical system or fully fluid, they are shown as involving speed functions as to the driving source and the driven source with an influence additionally from the driver through the vacuum and the parts interconnected for smooth, hydraulic control automatically effected. With the shaft 1 getting up to a speed of say 500 R. P. M., then the fly weight device 106 may be effective to so shift the valve plunger 109 that there is congestion of the exhaust from the hydraulic control in first speed of the gear 43. Driving is thus effected at this speed, which driving is automatic and as the motor shaft 1 builds up to, say a speed of 600 or more R. P. M., then the driven shaft 65 may have a speed of say 250 R. P. M. At this speed the valve plunger 92 may have the hydraulic control for the gear 34 open to the exhaust. As this speed increases, say above 250 R. P. M. for the driven shaft 65, automatic power control or fly weight device 89 may operate to shift the plunger 92 into closed position for the valve 93 for the car to be operating in second speed.

This is regardless of whether the plunger 109 has the valve 110 open or closed. As this has choked down the speed of the motor, the device 106 may open the valve 110, while if the speed is still retained, there may be overrunning or free wheeling of this second speed relatively to the first speed, due to the overrunning clutch device 57. As the speed of the driven shaft 65 builds up to, say 500 R. P. M., the plunger 92 may be so shifted not only to retain the valve 93 closed but also to operate the valve sleeve 98 to choke or cut-off exhaust 22. This may be at the speed of say ten miles per hour for the car, which is thus thrown into high or direct drive through the hydraulic device of the planetary system being locked. As the speed of the driven shaft 65 increases, the fly weight device 89 has greater influence. However, this influence may be modified due to the diaphragm device 114. This device may be considered as a torque modifier.

Initially, the setting may be one, say that for the automatic shifting from first speed to second to occur at say seven miles per hour, and from second to third or high at sixteen miles per hour. It is to be noted in these drives or connections hereunder that the gears are in mesh with each other at all times and there is thus advantage in the free wheeling as herein disclosed. In the automatic devices hereunder, it is further to be noted that the control to start the car depends upon the speed of the engine. The control to shift from first speed into second or third depends upon the speed of the car, which is thus of course modified by the load on the engine, and this load on the engine or speed at which these changes are to occur may be influenced manually by the operator of the car, as herein disclosed, in the position for the accelerator pedal. Depression of the pedal may shift the control so that the change from first to second occurs at ten miles and from second to high, at thirty-five miles. Accordingly, there is an influence on this automatic control as brought about by the position of the accelerator pedal.

A convenience under the installation of the transmission herein involving starting, say by rolling the car, may be effected by shifting the control into high with free wheeling cut-out. Thus as the car is pushed, the motor may in its starting automatically pick up in this high speed, and as the transmission is effective, step itself back into second and first. There is economy in the braking hereunder on the shaft 65, herein shown as hydraulic, over that say of allowing the motor to brake the car, for in the operation under the device of this disclosure, there is not required a consumption of gasoline by the motor nor oil at the motor for this hydraulic braking may be directly on the system itself.

In order that there may not be resistance to the shifting into free wheeling or in the manipulation as to the planetary hydraulic device, the plunger 104 may not be unduly resisted by trapped liquid, due to bypass relief device 192 (Fig. 2). In the matter of the overrunning clutch, angular pick up may be facilitated through springs 193 (Figs. 8, 9) to act between cam jaw faces 194, 195, in expanding such for frictional gripping with collars 196, 197. This holding action is effective for minimizing delay in transmission pick up.

The driven shaft 30 has therefrom fork 198 (Fig. 7) connected by the bolts 11 with the planetary housing 13. Accordingly there is the direct high speed drive when this housing 13 rotates with the driving shaft 1. This fork 198 is the direct connection with the shaft 30 past the first and intermediate speed gears.

The number of toothed gears may be materially reduced with retention of flexibility of control, except that it is in a general set up involving, as herein shown (Fig. 22) elimination of the feature of free wheeling. To this end, hydraulic pressure is supplied for say the first speed control from the drive shaft 1 through pump 199 connected by duct 200 to housing 201, valve 202 as an adjustable check. As pressure is built up in this chamber 201 and fly weight device 106 has a position to throw in the speed, there is transmission by the way of the arm 108 and plunger 109 to locate port 203 for flow of the pressure fluid from the duct 209 by way of the valve 202 and passage 203' for communication through the diaphragm 46 with hydraulic chamber 204. It is desirable to have the pressure at the relief valve, say a ten pounds pressure, so that operation does not occur here until the pressure is built up, although this fluid may be a lubricant as a part of the circulating system. This chamber 204, together with intermediate friction plate 205 is held to non-rotary plate diaphragm 46 by bolt 206. This chamber 204 includes plate 207 normally thrust clear or away from intermediate plate 208 by compression helical spring 209. Between the plate 208 and plate 210 of the chamber 204 are a plurality of slidable friction disks 211 spaced by stationary similar plate 205. These plates 211 have key assembly at key portions 212 with the gear 43. Accordingly, as pressure is developed in the chamber 204, there is frictional gripping through these plates 205, 211, 208, 210, for applying frictional resistance in holding the gear 43. There is thus a connecting in of the device for first speed driving. The release of pressure at the chamber 204 as well as in the casing 201 and the overflow is by duct 213 back to the pump 199.

For the control after the driven shaft 65 has come into operation, fluid pressure may be supplied by pump 214 on the shaft 65 or there may be a connection from the hydraulic brake (Figs. 10, 18). Fluid flow under pressure from this pump 214 may be by duct 215. Relief valve 216 in housing 217 may have passage 218 for fluid return to the pump 214. This duct 215 may have flow therefrom controlled by plunger 219 cooperating in a somewhat analogous manner to that of the plunger 92. This plunger 219 as associated with the lever 90 in the building up of speed of the driven shaft 65 may respond to the operation of fly weight 89 and bring port 220 to permit flow of pressure liquid by line 221 to hydraulic chamber 222, oppositely disposed as to the spacer plate 208 from the chamber 204. This chamber 222 has plate 223 anchored by the pin 206 and also plate 224, which laterally shiftable plate is engaged by the spacer spring means 209.

Rotatively fixed with the gear 34 but free for lateral shifting thereon is a plurality of friction plates 225 spaced by friction plate 226 anchored with the pin 206. Expansion of the chamber 222 under hydraulic pressure causes the plates 224, 226 and 208 to grip the plates 225 and hold such against rotation and thereby lock the gear 34. This effects the second speed driving as distinguished from the first speed driving and allows the overrunning to automatically cut out the transmission as would otherwise be effective through the gear 43.

Further building up of pressure or speed has its response at the lever 90 for check valve 227 to open from the duct 215 and allow flow as controlled by the port 220 by duct 228 to hub 229, thereby to connect duct 230 in the shaft 30. This duct 230 extends through the extension from this shaft 30 to plate 231 in substitution for the plate 13 at the planetary gearing housing.

This plate 231 has bolts 232 mounting plates 233, 234, as spaced by spring means 235. Additionally, there is a shiftable friction disk 236 held by these bolts 232. The overhang 5 from the internal gear 6 has external keying means 237 holding as free for lateral shifting but against angular movement a plurality of friction disks 238 to be gripped by the disk and plates 236, 233, 234, as fluid pressure from the duct 230 is communicated by branch 239 to charge chamber 240, thereby locking the planetary gear 10 with the gear 6 for direct rotation so that the driven shaft 30 is at the same rotative speed as the shaft 1.

The setting of the valve 202 may be at, say about ten pounds pressure. The valve 227 may operate, say at thirty pounds pressure in the cutover from second speed to high or direct drive. The relief valve 216 may be set at, say around forty pounds. When the vehicle slows up so the governors or speed devices 89 and 106 are inactive, then there is of course release of pressure in these systems, while additionally there is not the operation of the pumps to build up such pressures. The shiftings from second into third speed are influenced by the diaphragm device connected to the lever 111 which is a prime mover influenced control.

What is claimed and it is desired to secure by Letters Patent is:

A transmission embodying a driving shaft, a driven shaft, axially offset intermediate shafts, a governor for the driving shaft, an additional governor for the driven shaft, gearing between the driving and driven shafts including planetary gears on the intermediate shafts, hydraulic braking mechanism actuable from the driving shaft governor, a second hydraulic braking mechanism actuable from the driven shaft governor, and a control affecting connection between the driving and driven shafts as to the mechanisms and gearing, said control including a vacuum responsive valve for influencing a hydraulic braking mechanism.

ESTEL O. WHEATON.